US012353959B2

(12) United States Patent
Fowler

(10) Patent No.: US 12,353,959 B2
(45) Date of Patent: *Jul. 8, 2025

(54) QUANTUM ERROR CORRECTION

(71) Applicant: Google LLC, Mountain View, CA (US)

(72) Inventor: Austin Greig Fowler, Reseda, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,796

(22) Filed: Oct. 5, 2023

(65) Prior Publication Data

US 2024/0248798 A1 Jul. 25, 2024

Related U.S. Application Data

(63) Continuation of application No. 17/875,985, filed on Jul. 28, 2022, now Pat. No. 11,815,937, which is a (Continued)

(51) Int. Cl.
*G06N 10/70* (2022.01)
*G06F 11/10* (2006.01)
(Continued)

(52) U.S. Cl.
CPC ......... *G06N 10/70* (2022.01); *G06F 11/1076* (2013.01); *G06N 10/20* (2022.01); *G06N 10/60* (2022.01)

(58) Field of Classification Search
None
See application file for complete search history.

(56) References Cited

U.S. PATENT DOCUMENTS

| 8,244,662 B2 | 8/2012 | Coury et al. |
| 2004/0190719 A1* | 9/2004 | Lo ..................... H04L 9/0858 380/255 |

(Continued)

FOREIGN PATENT DOCUMENTS

| AU | 2007200501 | 8/2008 |
| CN | 104919476 | 9/2015 |

(Continued)

OTHER PUBLICATIONS

Almudever et al., "The engineering challenges in quantum computing," Design, Automation & Test in Europe Conference & Exhibition (DATE), Lausanne, Switzerland, 2017, pp. 836-845.

(Continued)

*Primary Examiner* — Daniel F. McMahon
(74) *Attorney, Agent, or Firm* — Fish & Richardson P.C.

(57) ABSTRACT

Methods, systems and apparatus for quantum error correction. A layered representation of error propagation through quantum error detection circuits is constructed. The layered representation includes multiple line circuit layers that each represent a probability of local detection events in a quantum computing system associated with potential error processes in an execution of a quantum algorithm. To construct the layered representation, potential detection events associated with each potential error process occurring at quantum gates in the quantum circuit are determined. Lines are associated with each potential error process, the lines each connecting a potential detection event associated with the potential error process to another potential detection event associated with the same potential error process or a boundary of the quantum circuit. Similar lines are merged and used to construct unique line circuit layers. The layered representation is transmitted to the quantum computing system prior to execution of the quantum algorithm.

18 Claims, 6 Drawing Sheets

Related U.S. Application Data continuation of application No. 16/645,756, filed as application No. PCT/US2017/051193 on Sep. 12, 2017, now Pat. No. 11,422,890.

(51) Int. Cl.
  *G06N 10/20* (2022.01)
  *G06N 10/60* (2022.01)

(56) References Cited

U.S. PATENT DOCUMENTS

| | | | |
|---|---|---|---|
| 2008/0185576 A1* | 8/2008 | Hollenberg | G06N 10/00 257/14 |
| 2014/0365843 A1 | 12/2014 | Ashikhmin | |
| 2015/0214984 A1 | 7/2015 | Ahn et al. | |
| 2016/0112066 A1* | 4/2016 | Ashikhmin | H03M 13/154 714/785 |
| 2016/0344414 A1* | 11/2016 | Naaman | H03M 13/157 |

FOREIGN PATENT DOCUMENTS

| | | |
|---|---|---|
| CN | 106537424 | 3/2017 |
| JP | 2016-521100 | 7/2016 |
| JP | 2017-522797 | 8/2017 |
| WO | WO 2019054990 | 3/2019 |

OTHER PUBLICATIONS

Fowler et al., "Towards practical classical processing for the surface code" submitted on May 2012, arXiv:1110.5133v2, 5 pages.
Fowler et al., "Towards practical classical processing for the surface code: timing analysis", submitted on Oct. 2012, arXiv:1202.5602v2, 13 pages.
International Preliminary Report on Patentability in International Appln. No. PCT/US2017/051193, mailed on Mar. 17, 2020, 9 pages.
International Search Report and Written Opinion in International Appln. No. PCT/US2017/051193, mailed on Jun. 21, 2018, 15 pages.
Knill et al., "Resilient quantum computation: error models and thresholds." Proceedings of the Royal Society of London. Series A: Mathematical, Physical and Engineering Sciences 454.1969, Jan. 1998, 365-384.
Notice of Allowance in Australian Appln. No. 2021225173, mailed on May 4, 2023, 3 pages.
Notice of Allowance in Canadian Appln. No. 3,075,253, mailed on Feb. 27, 2023, 1 page.
Notice of Allowance in Chinese Appln. No. 201780094834.5, mailed on Dec. 26, 2023, 7 pages (with English translation).
Notice of Allowance in Japanese Appln. No. 2020-514733, mailed on Feb. 7, 2022, 5 pages (with English translation).
Office Action in Australian Appln. No. 2017431764, mailed on Aug. 24, 2020, 4 pages.
Office Action in Canadian Appln. No. 3,075,253, mailed on Feb. 10, 2022, 4 pages.
Office Action in Canadian Appln. No. 3,075,253, mailed on May 20, 2021, 4 pages.
Office Action in Chinese Appln. No. 201780094834.5, mailed on Mar. 31, 2023, 22 pages (with English translation).
Office Action in European Appln. No. 17771968.9, mailed on Sep. 23, 2022, 4 pages.
Office Action in Japanese Appln. No. 2020-214733, mailed on Jul. 5, 2021, 13 pages (with English translation).
Office Action in Japanese Appln. No. 2022-035219, mailed on Mar. 27, 2023, 5 pages (with English translation).
Paler et al., "Synthesis of arbitrary quantum circuits to topological assembly: Systematic, online and compact." Scientific reports 7.1, Sep. 2017: 10414, 16 pages.
Ran et al., "Online Error Detection Method for Quantum Reversible Logic Circuits" Chinese Journal of Scientific Instrument, vol. 31, No. 11, Nov. 2010, 2534-2541 (with English abstract).
Extended European Search Report in European Appln. No. 24182366.5, mailed on Oct. 7, 2024, 10 pages.
Office Action in Japanese Appln. No. 2023-180600, mailed on Sep. 30, 2024, 13 pages (with English translation).

\* cited by examiner

QUANTUM ERROR CORRECTION

CROSS-REFERENCE TO RELATED APPLICATIONS

This application is a continuation of U.S. patent application Ser. No. 17/875,985, filed on Jul. 28, 2022, which is a continuation of U.S. patent application Ser. No. 16/645,756, now U.S. Pat. No. 11,422,890, filed on Mar. 9, 2020, which is a National Stage Application under 35 U.S.C. § 371 and claims the benefit of International Application No. PCT/US2017/051193, filed on Sep. 12, 2017. The disclosures of the foregoing applications are hereby incorporated by reference in their entirety.

TECHNICAL FIELD

The present disclosure relates to a method of quantum error correction. In particular, the present disclosure relates to methods of determining and correcting errors in an array of qubits executing a quantum algorithm in a quantum computer.

BACKGROUND

Quantum computers are computing devices that exploit quantum superposition and entanglement to solve certain types of problem faster than a classical computer. The building blocks of a quantum computer are qubits. Qubits are two-level systems whose state can be in a superposition of its two states, rather than just in either of the two states as is the case for a classical bit.

Quantum algorithms are algorithms executed on quantum computers. During the execution of these algorithms on a quantum computer, errors can be introduced from a number of sources including decoherence and noise. Due to the so-called "no-cloning theorem", classical error detection and correction techniques involving creating multiple copies of a state are unsuitable. Instead, quantum error detection and correction techniques involve entangling qubits with a number of other qubits, and performing measurements on a subset of the entangled qubits in order to identify when an error has occurred.

SUMMARY

According to a first aspect, there is described a method of correcting a stream of syndrome measurements produced by a quantum computer, the method comprising: receiving a layered representation of error propagation through quantum error detection circuits in the quantum computer, wherein the layered representation comprises a plurality of line circuit layers, each line circuit layer representing a probability of local detection events in the quantum computer associated with one or more potential error processes in the execution of the quantum algorithm; and during execution of the quantum algorithm: receiving one or more syndrome measurements from quantum error detection circuits in the quantum computer; converting the syndrome measurements into detection events written to an array, the array representing a patch of quantum error correction circuits at a sequence of steps in the quantum algorithm; determining one or more errors in the execution of the quantum algorithm from the detection events in dependence upon the stored line circuit layers; and causing correction of the syndrome measurements based on the determined errors.

The method may further comprise constructing the layered representation of error propagation through quantum error correction circuits prior to the execution of the quantum algorithm.

Constructing a layered representation of error propagation through the quantum error detection circuits may comprise: for one or more quantum gates in the quantum circuit, determining one or more potential detection events associated with each potential error process occurring at that quantum gate; associating one or more lines with each potential error process, the lines each connecting a potential detection event associated with the potential error process to another potential detection event associated with the same potential error process or a boundary of the quantum circuit; and merging similar lines to form one or more merged lines, wherein the plurality of unique line circuit layers are constructed from a plurality of the merged lines.

The lines may each be associated with a weight indicative of the probability of the associated potential error process. The weights may be discretised.

Merging similar lines may comprise combining lines having at least one of: a same start point and a same end point; a same direction and length; and/or a common potential error associated with each of the lines.

Potential error processes not common to similar lines forming a merged line may be removed from association with said merged line.

The detection events may be cyclically written to the array.

The array may comprise a plurality of layers, the number of layers being a power of two.

The array may be stored in a processor cache during execution of the quantum algorithm.

The array may be representative of a local patch of quantum error correction circuits in the quantum computer.

Determining the errors in the execution of the quantum computing algorithm may comprise using a perfect matching process.

Determining the errors in the execution of the quantum computing algorithm comprises using a minimum weight perfect matching process to pair detection events in the array that are connected by one or more lines in one or more of the line circuit layers.

Determining the errors in the execution of the quantum computing algorithm may comprise using minimum weight perfect matching to match one or more detection events with a boundary of array.

Determining the errors in the execution of the quantum computing algorithm may comprise at least one of: exploring the array around a selected detection event to find an untouched detection event and pairing the selected detection event with the untouched detection event; and/or exploring the array around a selected detection event to find a previously explored region associated with a different detection event and pairing the selected detection event with the different detection event.

The exploration of the array around a selected detection event may be guided by the line circuit layers.

The layered representation may constructed by a separate computer.

According to a further aspect, there is also described a system comprising: a quantum computer for executing a quantum algorithm comprising a plurality of quantum error detection circuits; and one or more classical processing cores, wherein a set of one or more classical processing cores are configured to any of the methods described herein.

The system may further comprise a further one or more classical processing cores configured to construct the layered representation of error propagation through quantum error detection circuits in the quantum computer.

According to a further aspect, there is also described a computer program which, when executed by a processing core, causes the processing core to perform any of the methods described herein.

DETAILED DESCRIPTION

Figure 1:
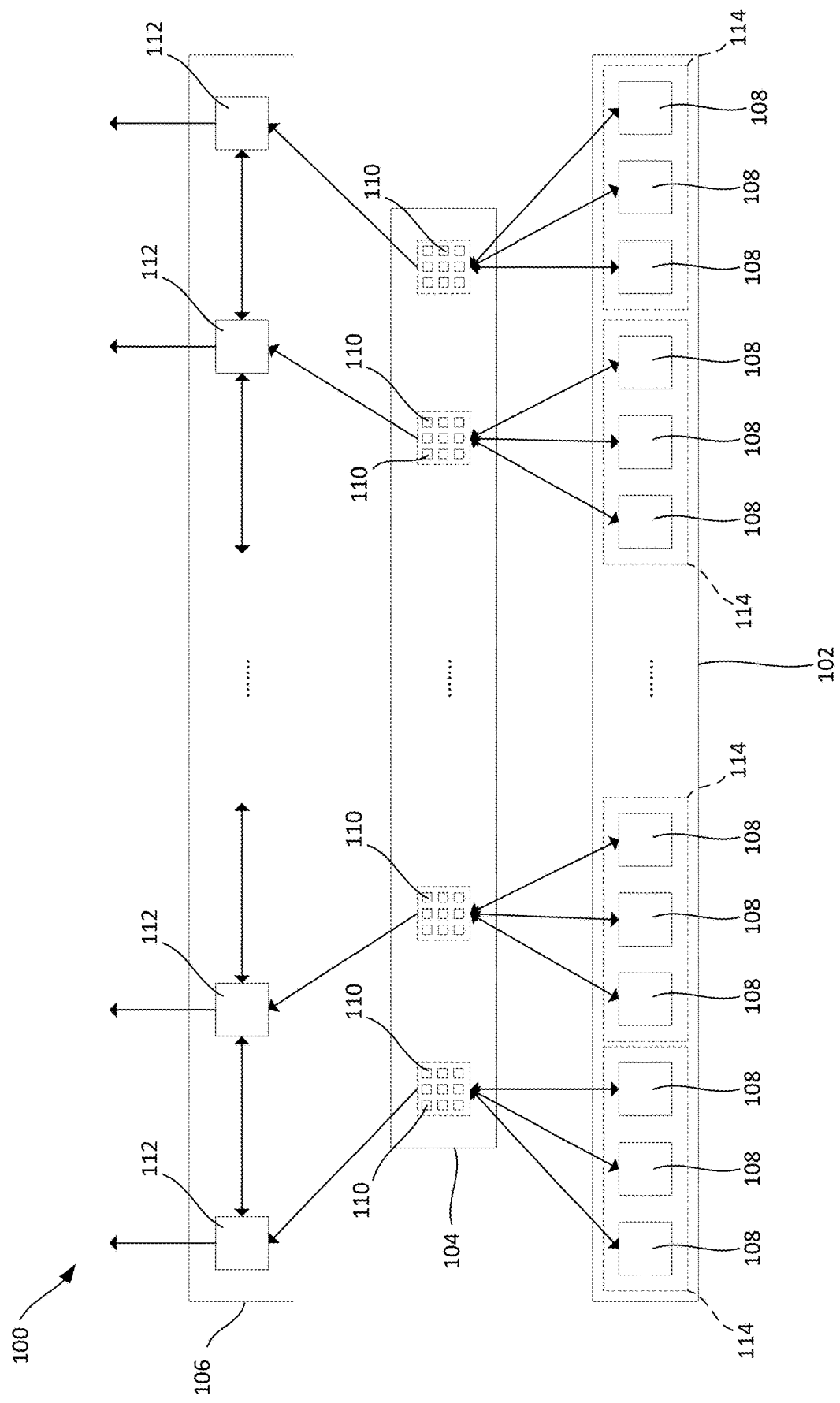
FIG. 1 shows a schematic example of a quantum computing system.

FIG. 1 illustrates a schematic example of an embodiment of a quantum computer 100.

The quantum computer 100 comprises a quantum computing layer 102, a control layer 104 and a classical processing layer 106.

The quantum computing layer 102 comprising comprises an array of quantum devices or qubits 108 configured to perform a quantum computing algorithm. The quantum devices or qubits 108 comprise a mixture of data qubits and syndrome qubits (also referred to herein as measurement qubits). The quantum computing layer 102 further comprises a plurality of quantum gates (not shown) for performing operations on the qubits 108. In some embodiments, the quantum computing layer is in the form of a 2D two-dimensional array of quantum devices 108.

The quantum devices or qubits 108 can, for example, be superconducting qubits. The quantum computing layer 102 is kept at a sufficiently low temperature to maintain coherence between qubits throughout the execution of the quantum algorithm (for example, below 20 mK. In order to facilitate high coherence, the qubits may be cleanly manufactured. Qubit geometry may also be chosen to enhance coherence. In embodiments where superconducting qubits are used, the temperature is kept below the superconducting critical temperature. To improve coherence, the temperature can be kept well below the superconducting critical temperature. Herein, for the term "qubit" and "quantum device" will be used interchangeably.

A control layer 104 comprising a plurality of control devices 110 is interposed between the quantum computing layer 102 and the classical processing layer 106. The control devices 110 receive raw measurement data from qubits 108 in the quantum computing layer 102 and convert them into binary measurement data for use in the classical processing layer 106. The control devices 110 can, in some embodiments, also issue instructions to the quantum devices 108, for example to instruct a quantum gate (not shown) to perform a qubit rotation. In some embodiments, each control device 110 is connected to around six quantum devices 108. The control devices 110 are, in some embodiments, Field Programmable Gated Arrays (FPGAs).

The classical processing layer 106 comprises an array of processing cores 112. The classical processing layer 106 is coupled to the quantum computing layer 102 via the control layer 104. Processing cores 112 in the classical computing layer 106 are associated with local patches 114 of qubits 108. A local patch 114 comprises a plurality of qubits 108 is grouped together. In some embodiments, the patch size is around one-hundred qubits. Each processor core comprises a central processing unit ("CPU" or "processor") and on-chip cache memory in the form of L1 and L2 caches (herein referred to as a "processor cache"). Processing cores 112 in the classical processing layer 106 are coupled to neighbouring processing cores 112 in the classical processing layer 106. This can allow for the processing cores 112 to exchange data with their neighbouring cores. In some embodiments, the processing cores 112 form a two-dimensional array of processing cores 112 within the classical processing layer 106.

The classical processing cores 112 are provided with dedicated assembly instructions, that, when executed by a processor in the processor core, cause the processor to access the processor cache of a neighbouring core. This can result in low latency communication between neighbouring cores, as a complex memory controller is not needed.

In use, the quantum computing layer 102 executes a quantum computing algorithm, such as Shor's algorithm or the Deutsch-Jozsa algorithm for example. Syndrome qubits in the quantum computing layer 102 interact with their neighbouring data qubits to produce raw measurement data. The raw measurement data is fed into the control devices 110 of the control layer 104. The control devices 110 convert the raw measurement data into binary measurement data and stream the binary measurement data into the processing cores 112 of the classical processing layer 106.

The classical processing layer 106 converts the binary measurement data from the control layer 104 into parities of the quantum states of qubits 108 in the quantum computing layer 102 that were measured. These parities are then processed by the classical processing layer 106 to determine any quantum errors and/or the required corrected parities for the quantum devices 108 in the quantum computing layer 102. The determined corrections can then be processed further to determine and cause the required corrective action. In some embodiments, this further processing can be performed in additional classical processing layers (not shown).

Figure 2:
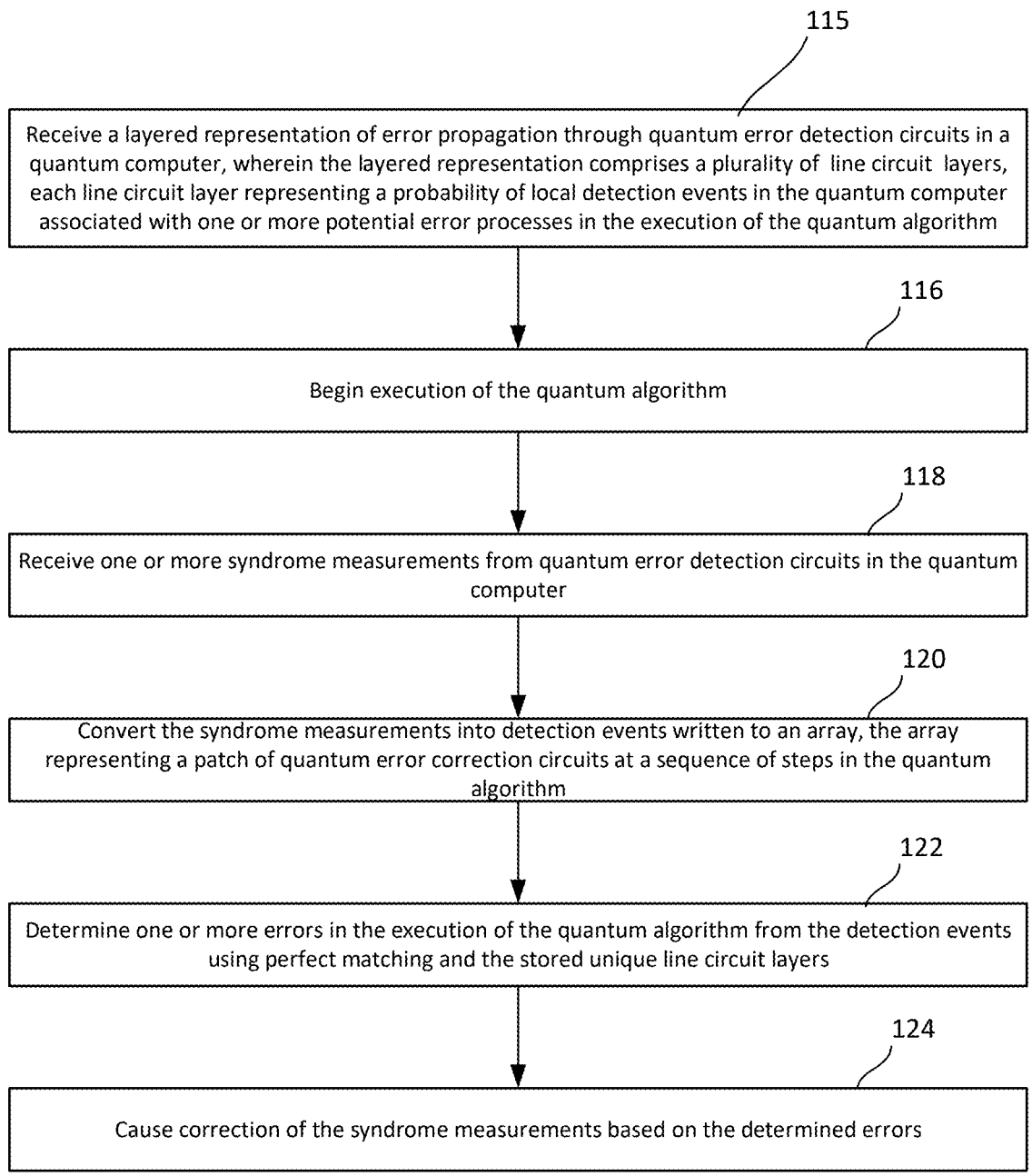
FIG. 2 shows a flow diagram of an overview of a method for quantum error correction.

FIG. 2 shows a flow diagram of an example of a method for correcting errors in a quantum computer. In the following, the method will be described in relation to the quantum computer in FIG. 1. However, in general it can be performed by any quantum computing system that provides syndrome measurements from qubits to one or more classical processing cores.

The method (herein also referred to as a quantum error correction method) corrects a stream of measurement data obtained from syndrome qubits in a quantum computer. In some embodiments, the method is used to correct errors in a two-dimensional array of qubits, such as the quantum computing layer described above in relation to FIG. 1. In other embodiments, the method can be applied to a one-dimensional array of qubits.

At operation 115, the classical processing cores 112 in the classical processing layer 106 receive a layered representation of error propagation through quantum error detection circuits in the quantum computer 100, wherein the layered representation comprises a plurality of line circuit layers, each line circuit layer representing a probability of local detection events in the quantum computer associated with one or more potential error processes in the execution of the quantum algorithm.

In some embodiments, the layered representation comprises one or more layers (also referred to herein as line circuit layers). Each line circuit layer represents one or more potential detection events that can occur during a round of error detection at stages of the quantum algorithm. For example, a layer can comprise a representation of all the detection events that can occur at syndrome qubits during a round of error detection during execution of the quantum algorithm.

Emanating from each of the one or more potential detection events in a layer is a set of weighted lines connecting that detection event to one or more other potential detection events. The other potential detection events can occur in the same round of error detection as the detection event from which the line emanates, and hence lie within the same layer. The other detection events can also be in other rounds of error detection.

The weight of each line is representative of the probability of detection events at each end of the line occurring together as the result of an error. In some embodiments, the lines are weighted such that higher probability lines have a lower weight than lower probability lines. For example, the lines can be weighted according to:

$$w_i = -C \ln p_i,$$

where $w_i$ is the weight of the $i^{th}$ line, $p_i$ is the probability associated with the $i^{th}$ line, and C is a constant.

The layered representation is pre-determined based on knowledge of the quantum algorithm and the possible errors that can occur during its execution. By predetermined, it is meant that the layered representation is determined before the execution of the quantum algorithm begins. In some embodiments, the layered representation is constructed by a separate computing system to the quantum computing system. For example, the layered representation may be constructed by a remote computing system based on knowledge of the quantum algorithm that will be run on the quantum computing system. The layered representation can be transmitted from this remote computing system to the quantum computing system prior to the execution of the quantum algorithm.

In some embodiments, the layered representation is chosen such that the representation for each local patch of quantum devices in the quantum computing layer fits into the processor cache of the corresponding processor core in the first classical computing layer. This can reduce or even eliminate the number of computationally slow RAM retrievals performed by the processor cores in the classical computing layer, which can speed up the error correction. Construction of the layered representation will be described in more detail below in relation to FIG. 4.

At operation 116, the quantum computer begins execution of a quantum algorithm. A quantum algorithm is executed in a quantum computer. In some embodiments, the quantum computer executed the quantum algorithm in a quantum computing layer, as described in relation to FIG. 1. The quantum computer executes a quantum algorithm with a surface code being used for error correction. The surface code can be visualized as a large checker-board. Each square represents a qubit. White squares correspond to qubits being used to store data, and are referred to as data qubits. Black squares correspond to qubits being used to check for errors in their neighbouring four data qubits, and are referred to as measurement or syndrome qubits. Computation is achieved by turning on and off regions of the surface code. Physically, this involves causing the measurement qubits to cease interacting with data qubits within specific regions of the quantum computing layer.

During execution of the quantum algorithm, syndrome qubits perform measurements on neighbouring data qubits to produce syndrome measurements. These measurements can be transmitted to the classical processing layer for processing to determine if any errors have occurred in the execution of the quantum computing algorithm. In some embodiments, the syndrome measurements are transmitted to the classical processing layer via the control layer.

Rounds of measurements are performed sequentially in time. The results of the method can be visualized as operating in a two dimensional (for a one-dimensional array of qubits) or three dimensional (for a two-dimensional array of qubits) data structure, sometimes called the space-time or volume.

At operation 118, the classical processing cores 112 receive one or more syndrome measurements from quantum error detection circuits in the quantum computer.

In some embodiments, the syndrome measurements pass via the control layer in the quantum computing system. The control layer converts the raw syndrome measurement data into binary measurement data that can be processed by the classical processing cores. This binary syndrome measurement data is transmitted from the control to the classical processing cores for further processing.

In some embodiments, the classical processing cores receive the syndrome measurement data in its raw form.

At operation 120, the classical processing cores 112 convert the syndrome measurements into detection events written to an array, the array in each processing core representing a patch of quantum error correction circuits at a sequence of steps in the quantum algorithm.

The array in each processor core is constructed from the layered representation by building the array sequentially from layers representing the steps of the quantum algorithm. As a new round of error detection is preformed, each processor core adds a layer to the array representing that error detection round. A particular layer may be repeated multiple times within the array, either in succession or not, in dependence on the quantum algorithm being performed.

In some embodiments, the array is written cyclically to the processor cache of a processing core 112. Each processor cache stores an array representative of the local patch of qubits associated with its processing core 112.

In some embodiments, a detection event is determined to have occurred when a change in the measurement compared to previous syndrome measurements is detected. The change in value of the syndrome measurements is indicative of an end point of an error chain. The determined detection event is written to the array.

At operation 122 the classical processing cores 112 determine one or more errors in the execution of the quantum algorithm from the detection events using perfect matching and the stored line circuit layers.

Errors in the execution of the quantum computing algorithm are determined by matching pairs of detection events in the array, or by matching a detection event to an abstract boundary of the array. Pairs are matched such that the most likely pairings are found.

The pairing of detection events is performed by processing cores in the classical processing layer. Each processor core attempts to match the detection events in its array with detection events in the same array, detection events in the arrays of neighbouring processing cores, and/or an abstract boundary of the quantum circuit.

At operation 124 correction of the syndrome measurements based on the determined errors is performed.

Figure 3:
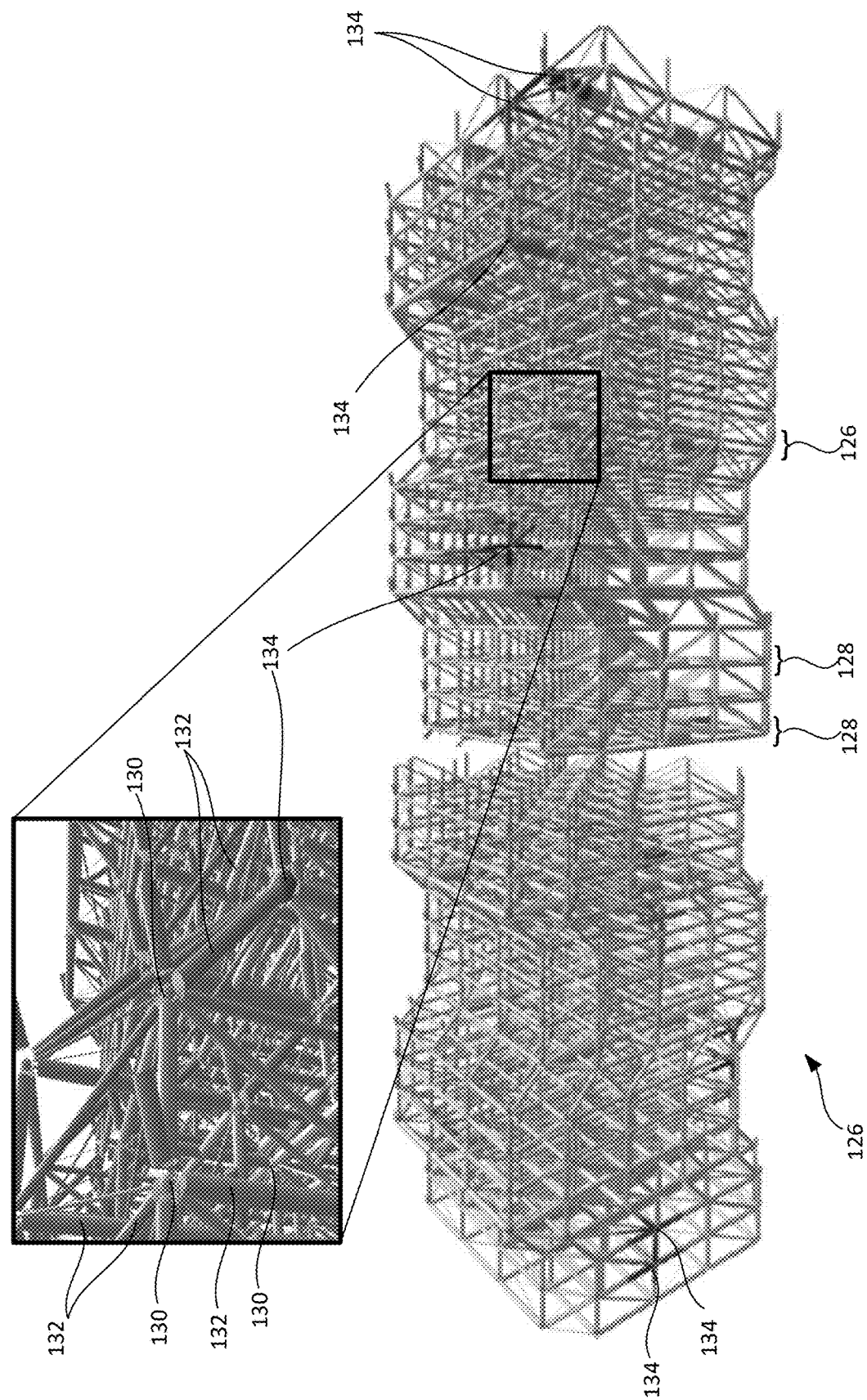
FIG. 3 shows an example of a three dimensional data structure representing a plurality of rounds of syndrome measurements.

FIG. 3 shows an example of a three dimensional data structure representing a plurality of rounds of syndrome measurements. The three dimensional data structure is in the form of an array 126. The array 126 comprises a plurality of line circuit layers 128 (not all layers are labelled in FIG. 3). Each layer 128 is representative of a round of syndrome measurements at a local patch of qubits performed during the execution of the quantum algorithm.

The array 126 is constructed from line circuit layers 128 in the layered representation. Each layer 126 comprises a plurality of points 130 (not all points are labelled in FIG. 3) and a plurality of lines 132 (not all lines are labelled in FIG. 3). Each point in the array corresponds to a potential error detection event at a syndrome qubit during the execution of the quantum algorithm. One or more lines 132 emanate from each point 130 in the array. Lines 132 connect pairs of points in the array that correspond to detection events resulting from known potential errors in the execution of the quantum algorithm.

During execution of the quantum algorithm, an array 126 representative of a local patch of quantum devices is constructed in a classical processing core. The array 126 is constructed from the layered representation. In some embodiments, such as the embodiment shown, the array 126 is written cyclically to the processor cache of the processor core. The break in the array indicates the layer representing the current round of error detection measurements.

As measurement data is streamed to the processor core, detection events 134 (only some of which are labelled in the figure) are identified and written to the array. The processor core attempts to pair up these detection events 134 using the lines 132 that emanate from them. In embodiments where lines 132 are weighted to have a lower weight for a higher probability of the line 132 occurring, detection events 134 are paired using minimum weight perfect matching.

Figure 4:
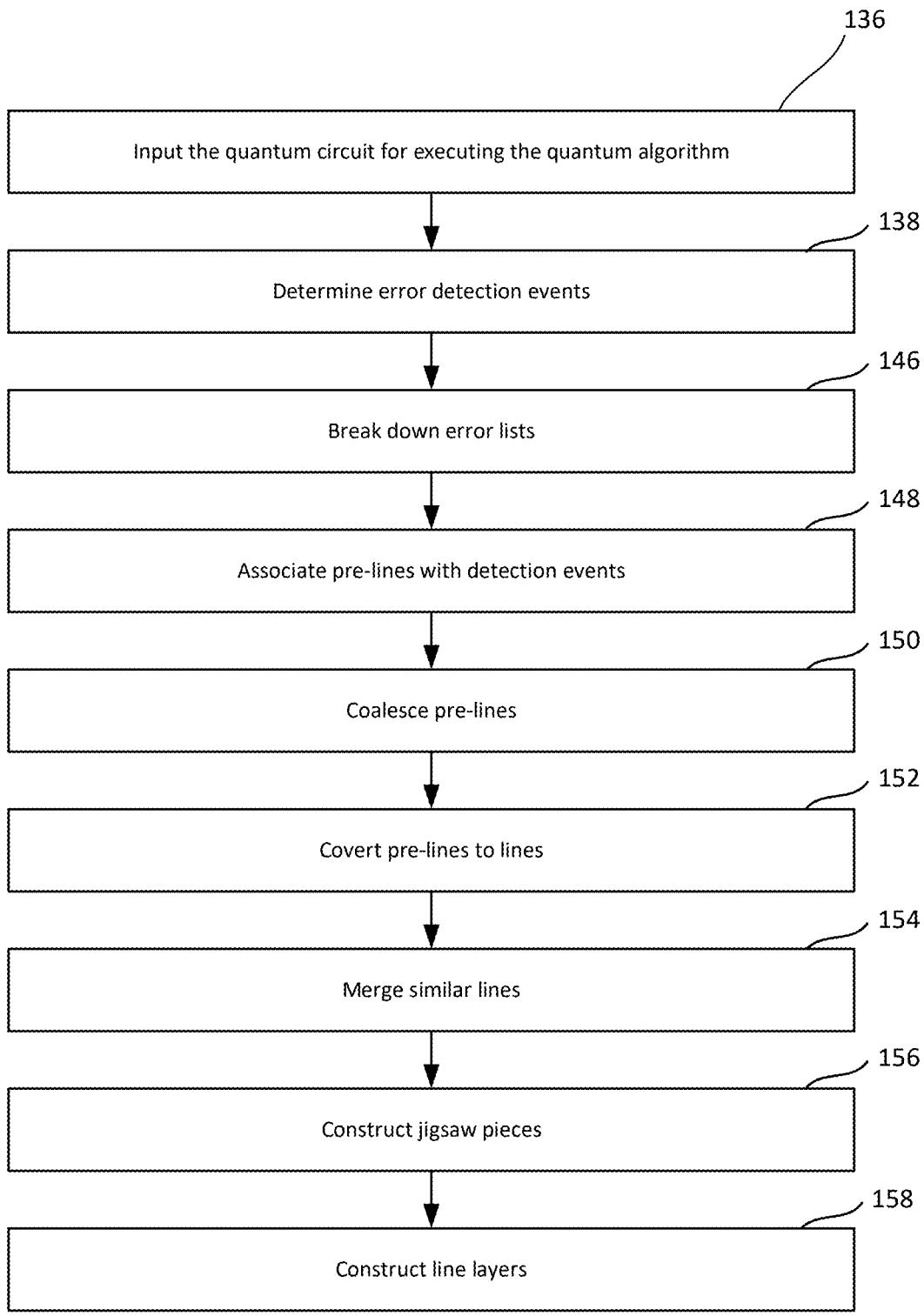
FIG. 4 shows a flow diagram of an example of a method for generating a layered representation of potential errors in a quantum algorithm.

FIG. 4 shows a flow diagram of an example of a method for generating a layered representation of potential errors in a quantum algorithm. Prior to the execution of the quantum algorithm, the data structures required for the algorithm are constructed.

At operation 136 the quantum circuit used for the execution of the quantum algorithm is input. An input file describing the quantum circuit used to implement quantum error detection is either read, or first generated and then read, into a classical computer. The input file describes the gate operations performed by qubits in the quantum computer to generate each round of syndrome measurement data and/or to execute the quantum algorithm.

At operation 138 potential error detection events in the quantum circuit are determined. For every gate in the circuit, one or more possible error processes is simulated. In some embodiments, every potential error at the gates is simulated. Single-qubit errors are simulated for single-qubit gates, and two-qubit errors are simulated for two-qubit gates.

The resulting detection events at one or more of the syndrome qubits are then determined. A detection event is a point in space and time where a stream of measurement results from a syndrome qubit changes value. The result is a list of all gate error processes.

Figure 5:
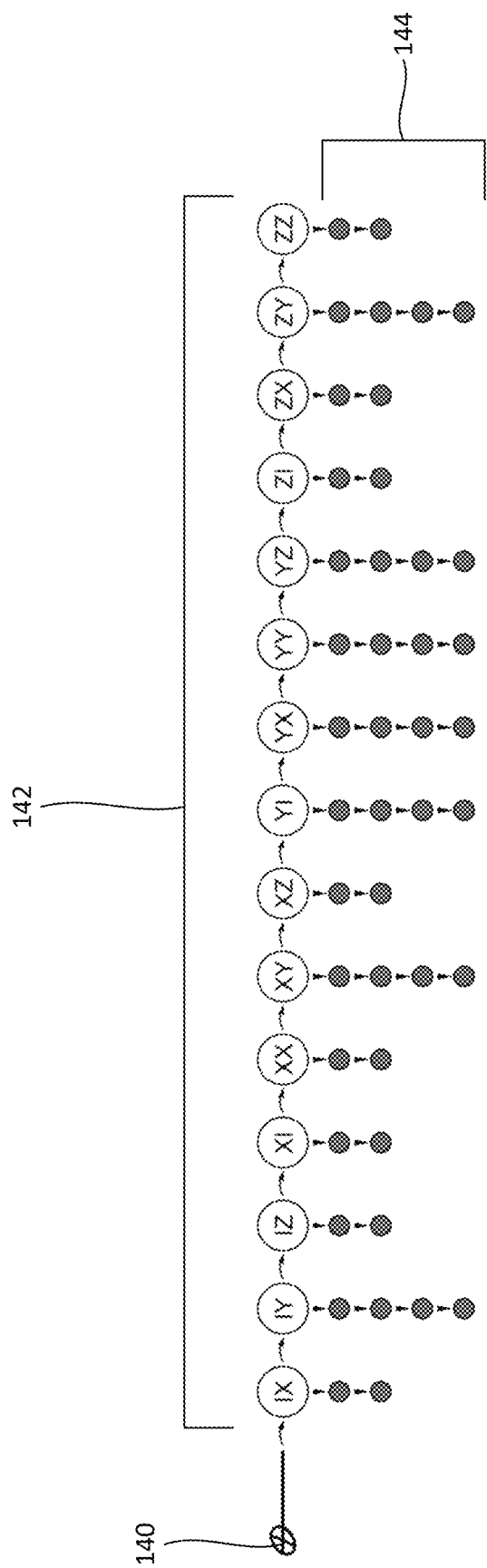
FIG. 5 shows an example of a list of detection events associated with potential errors occurring at a quantum gate.

Each potential error is associated with a list of detection events that result from it. In some embodiments, each error will have between 0 and 4 detection events associated with it. FIG. 5 shows an example of a list of detection events associated with potential errors occurring at a quantum gate 140.

A number of errors 142 can occur at a quantum gate 140 in the quantum circuit during execution of the quantum algorithm. These errors are simulated by the classical computer, and the resulting detection events 144 at syndrome qubits in the quantum circuit are determined for each error.

Referring again to FIG. 4, at operation 146, the error lists are broken down into shorter error lists. For each error with more than two associated detection events, this comprises constructing the detection event list from other lists of detection events associated with other errors with no more than two detection events associate with them.

At operation 148, "pre-lines" are associated with each list of errors. For each error associated with two detection events, a "pre-line" is associated which connects the two detection events. For each error associated with one detection event, a pre-line leading to an abstract boundary of the space-time is associated.

Each of these types of pre-lines is assigned the full probability of its generating error occurring. Errors associated with more than two detection events get associated with lists of pre-lines that collectively cover these detection events. In some embodiments, multiple distinct lists of pre-lines can exactly cover the list of detection events, and all lists are found. If there are N lists, each pre-line in each list gets assigned 1/Nth of the probability of its generating error.

At operation 150, pre-lines are coalesced. For example, if two pre-lines start and end at the same locations in space-time, the pre-lines are replaced with a single pre-line having the total probability of the original two. This process is continued until no pre-lines can be coalesced. In addition to the total probability, the coalesced pre-lines retain a list of all the errors generating detection events at their endpoints.

At operation 152, the pre-lines are converted to lines. Every pre-line not ending on the abstract boundary has potentially two lines associated with it. Pre-lines connect two specific locations in space-time. By contrast, lines are vectors. For example a single time-axis aligned pre-line can become two lines, one pointing into the future, and one pointing into the past. However, a pre-line ending at the abstract boundary will potentially only become a single line. Each line keeps a list of all errors leading to the pre-line, but with error positions made relative rather than absolute. Each error is propagated back to the beginning of the circuit it is associated with, forming a circuit-independent list of errors for each original error.

In some embodiments, pre-lines are converted into lines if: the new line would point in a different direction or have a different length to any previous line; the new line would have a different total probability despite pointing in the same direction and having the same length as a previous line; or the new line points in the same direction, has the same length, and the same total probability as one or more existing lines, but has no error lists in common with any of these lines. Each point in space-time is therefore associated with a list of lines containing 0 or more entries. The total number of times each line appears in some list (the "count" of the line) is recorded. Some lines have much higher counts than others.

At operation 154, similar lines are merged. Lines are determined to be similar if they point in the same direction, have the same length, and/or share one or more errors. In some embodiments, all three conditions are required to determine that lines are similar. Errors not common to both lines are discarded. The probability of the merged line, $p_l$, is set to be:

$$p_l = p_1^{\left(\frac{N_1}{N_1+N_2}\right)} p_2^{\left(\frac{N_2}{N_1+N_2}\right)},$$

where $p_1$ is the probability associated with the first line, $P_2$ is the probability associated with the second line, $N_1$ is the count of the first line and $N_2$ is the count of the second line.

In some embodiments, where there are more than two lines that are determined to be similar, the pair with the minimum total count ($N_1+N_2$) is chosen for merging. This can minimize the impact of information-lossy merging.

In some embodiments, lines are combined until there are fewer than 256 unique lines. By combining lines, the total number of lines can be reduced, which can simplify the identification of errors in the execution of the quantum algorithm. Reducing the number of lines can also reduce the size of the data-structures used in quantum error correction. In some embodiments, the size of the data-structures can be reduced to fit into the processor cache of a processor core. This can speed up execution of the error correction, as less or even no external memory access will be used. Accordingly, this results in a technological improvement in the field of quantum error correction in that fewer processing resources-memory and processing cycles—are require than in systems that do not implement the systems and methods described in this specification.

At operation 156 "jigsaw pieces" are constructed from the unique lines. The circuit description may contain instructions such as "repeat this sequence of circuit layers n times" and therefore the true data structures in every step can be made out of the smallest conveniently constructible number of jigsaw pieces that can be repeated to form the data structure corresponding to the complete circuit. The number of pieces can change from step to step. This decomposition into repeating pieces is necessary as the total number of repetitions of different parts of the circuit can be so large that it would not be feasible to construct and manipulate a non-decomposed representation of each step.

At operation 158 the combined lines are used to construct line circuit layers. Once the final compressed list of lines is obtained, the minimum number of unique layers of lines required to describe the complete data structure can then be constructed. Only the shortest error list for each line is kept.

The result is a highly compressed data structure representing the error detection part of the quantum circuit that can fit into the processor cache of a processor core. In some embodiments, the data structure is small enough to fit into the L1 cache of a processor core. Each line in each layer represents an approximation of the total probability of observing detection events at the endpoints of the line. Detection events in the quantum circuit occur at the endpoints of lines.

A complete run of the algorithm considers of order 100 qubits per local patch executing potentially millions of rounds of error detection during the operation of the quantum computer. The algorithm converts the stream of syndrome measurements from the quantum computer into a smaller number of detection events. The detection events are randomly distributed in the space-time. Rather than storing these detection events in a huge space-time, in some embodiments just thirty-two rounds, each with enough space for a sixteen-by-sixteen array of qubits, are kept. In some embodiments, it can be advantageous that the array dimensions are all powers of two.

To be explicit, in embodiments where thirty-two layers are stored, detection events associated with detection circuit zero will be stored in space-time layer zero, as will detection events associated with detection circuit thirty-two, sixty-four, and so on. The cyclic use of a small volume of space-time with power-of-two size allows the direction and length of each line to be represented using a single 2 byte integer. Each space-time location can be considered a voxel, and given the index of any voxel, the index of any other voxel can be calculated by adding this 2 byte integer and discarding any unnecessary high bits. This can greatly speed up processing. Furthermore, as the data structures fit into the L1 cache, less or even no computationally expensive main RAM accesses are used, which can also speed up the method.

During execution of the algorithm, measurement data from the syndrome qubits in the quantum computer are streamed into processor cores in a classical computing layer (as described in relation to FIG. 1, for example). In some embodiments, each processor core handles a local patch of around 100 qubits.

As the algorithm is executed, detection events start to populate the cyclic array representing the space-time volume currently being considered by the processor core. These detection events are the endpoints of unknown error chains, and must be matched up with other detection events or a boundary in order to determine a reasonable set of errors to use as the basis for corrections to the stream of syndrome measurements. Detection events are matched along paths of lines connecting them. As described above, each line has a list of errors that can be used in the correction of an error if the line is part of a matched path. The corrections propagate through the error detection circuits by flipping measurement values. This propagation is itself potentially computationally expensive and must be carefully compiled into a collection of cheap bit register manipulations before the quantum computer begins execution.

Figure 6:
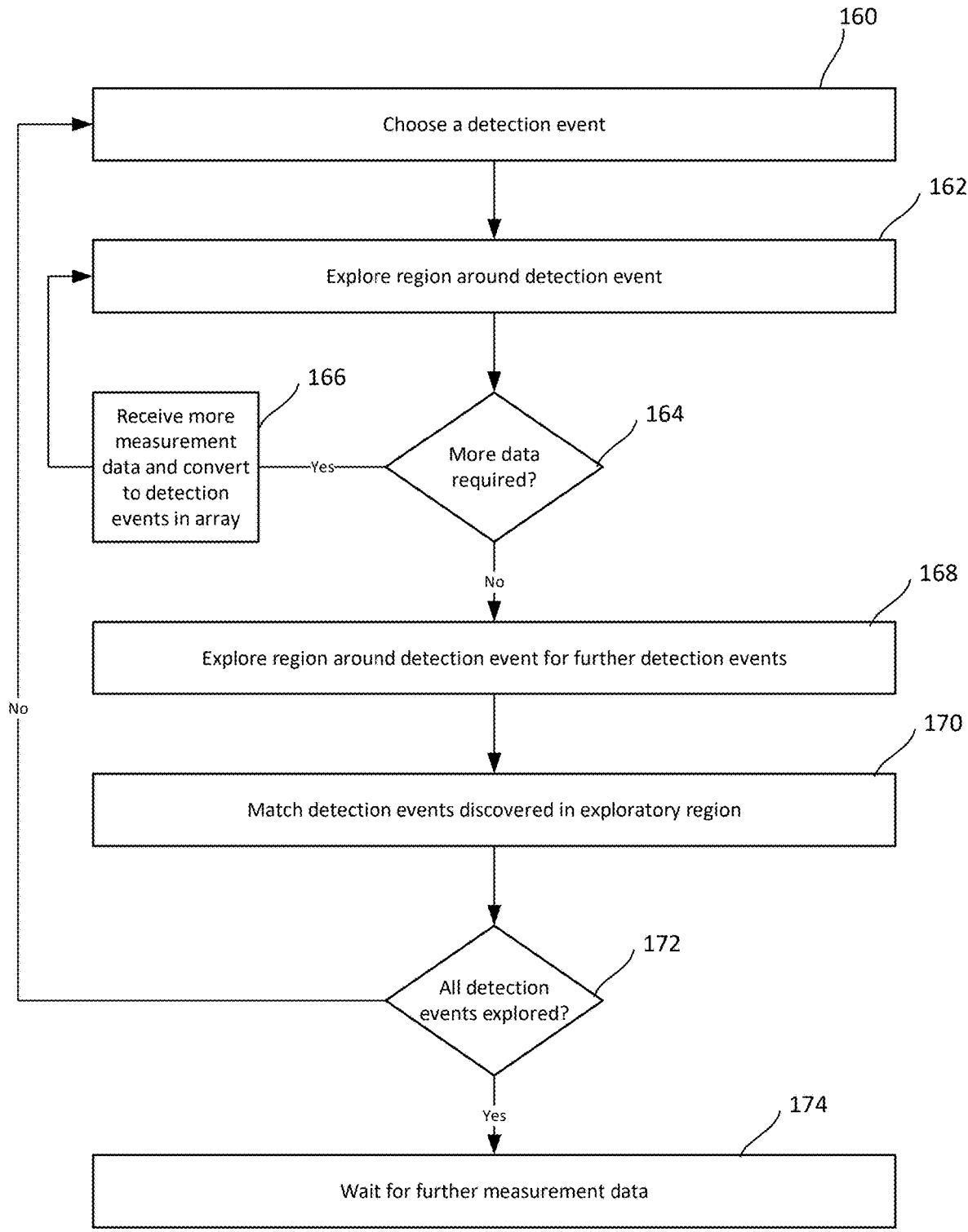
FIG. 6 shows a flow chart of an example of a method of determining errors in the execution of the quantum algorithm from the detection events.

FIG. 6 shows a flow chart of an example of a method of determining errors in the execution of the quantum algorithm from the detection events. In embodiments where the line weights are lower for lines with a higher probability of their associated errors occurring, minimum weight perfect matching is used to match the detection events.

At operation 160 an unmatched detection event in the array is chosen. The event can, in some embodiments, be chosen at random from the array. Alternatively, the detection event may be chosen using a rule, such as choosing the oldest unmatched detection event for example.

At operation 162, the array around the chosen detection event is explored. The lines emanating from the chosen detection event are treated like "water pipes", with the "water" traveling more quickly along the lines with higher probability. The region of space-time with water associated with a given detection event is called that detection event's exploratory region. For example, lower weighted lines can be thought of as narrower pipes. During the exploration, the same volume of water can be added to each of the pipes. The water will extend further along the length of the narrow pipes than the wider ones (which are associated with lower probability event pairings).

At operation 164, it is determined whether additional measurement data is required. If the exploratory region starts flowing towards a space-time layer for which syndrome qubit measurement data is not yet available, then it is determined that more data is required.

If this determination is positive, additional syndrome measurement data is obtained at operation 166. The quantum computer provides this data by performing another round of error detection.

If this determination is negative, then at operation 168 the array continues to be explored around the detection event.

At operation 170 detection events found in the exploratory region are matched. Exploratory regions of different detection events are not permitted to overlap. If two detection events can be found such that just enough water can be added to each such that their exploratory regions touch without overlapping any other exploratory regions, they can be matched.

In more complicated situations, an alternating tree will be created that may in turn lead to blossoms being created or destroyed, and these details are described in the "Timing analysis" paper.

At operation 172, the processor core determines whether any unmatched detection events remain in the array. If unmatched detection events remain, another detection event is chosen, and the process is repeated.

If no further detection events remain, at operation 174 the processor core waits for further syndrome measurement data from the quantum computer.

In some embodiments, the exploration of the neighbourhood around a detection event is handled in a hierarchical manner. By checking one or more simpler cases before calling the general matching algorithm, the efficiency of the matching can be improved.

The initial step of the hierarchy is to explore the array around a selected detection event to find an untouched detection event and pair the selected detection event with the untouched detection event. Firstly, when a detection event is first created it is impossible for any neighbouring space-time voxel to contain any water. Such detection events are called untouched. If a pair of neighbouring untouched detection events can be found, it is possible to add just enough water to each to enable them to be matched without first checking for water in all of the voxels neighbouring both of these detection events. If this is the case, then these events are matched, and then another detection event is chosen. If no pair of neighbouring untouched detection events cannot be found, then the next special case is considered.

The second step of the hierarchy is to explore the array around a selected detection event to find a previously explored region associated with a different detection event and pair the selected detection event with the different detection event. Given neighbouring touched detection events (that is to say, detection events with water already added to their lines), the maximum amount of water possible to add to each must be calculated by checking how much water is in each of the neighbouring voxels and subtracting this from the weight of the line to that voxel. If enough water can be added to each to permit a matching (i.e. no other detection event exploratory region will be overlapped with), this is done, and another detection event is chosen.

If neither of the above cases applies, the general minimum weight perfect matching algorithm is called.

Implementations of the quantum subject matter and quantum operations described in this specification may be implemented in suitable quantum circuitry or, more generally, quantum computational systems, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements may be used to perform quantum processing operations. That is, the quantum circuit elements may be configured to make use of quantum-mechanical phenomena, such as superposition and entanglement, to perform operations on data in a non-deterministic manner. Certain quantum circuit elements, such as qubits, may be configured to represent and operate on information in more than one state simultaneously. Examples of superconducting quantum circuit elements that may be formed with the processes disclosed herein include circuit elements such as co-planar waveguides, quantum LC oscillators, qubits (e.g., flux qubits or charge qubits), superconducting quantum interference devices (SQUIDs) (e.g., RF-SQUID or DCSQUID), inductors, capacitors, transmission lines, ground planes, among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analogue or digital form. In some implementations, classical circuit elements may be used to transmit data to and/or receive data from the quantum circuit elements through electrical or electromagnetic connections. Examples of classical circuit elements that may be formed with the processes disclosed herein include rapid single flux quantum (RSFQ) devices, 30 reciprocal quantum logic (RQL) devices and ERSFQ devices, which are an energy-efficient version of RSFQ that does not use bias resistors. Other classical circuit elements may be formed with the processes disclosed herein as well.

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of implementations have been described. Nevertheless, it will be understood that various modifications may be made without departing from the spirit and scope of the invention. Other implementations are within the scope of the following claims.

The invention claimed is:

1. A method comprising:
   receiving one or more syndrome measurements from a current round of error detection performed by quantum error detection circuits in a quantum computer that executes a quantum algorithm;
   converting the one or more syndrome measurements into detection events for the current round of error detection, wherein the detection events for the current round of error detection are written to a three dimensional data structure in the form of an array, the array comprising multiple line circuit layers representing previous rounds of error detection performed by the quantum error detection circuits at a sequence of steps in the quantum algorithm;
   determining one or more errors in the execution of the quantum algorithm from the detection events for the current round of error detection in dependence upon the multiple line circuit layers in the array, wherein
      each line circuit layer of the multiple line circuit layers comprises a plurality of points, each point corresponding to an error detection event identified during a round of error detection represented by the line circuit layer,
      the multiple line circuit layers comprise a plurality of unique lines, each unique line connecting pairs of points in the array, wherein a weight of each unique line represents a combined probability of detection events at each end of the line occurring together as a result of errors associated with one or more potential error processes in the execution of the quantum algorithm, and
      determining one or more errors in the execution of the quantum algorithm from the detection events for the current round of error detection comprises matching the detection events for the current round of error detection to other detection events along paths of unique lines in the array; and
   causing correction of the one or more syndrome measurements based on the one or more errors.

2. The method of claim 1, wherein the weights are discretised.

3. The method of claim 1, wherein the plurality of unique lines in the multiple line circuit layers are constructed from a plurality of merged lines, wherein the merged lines comprise similar lines, wherein the similar lines comprise lines associated with each potential error process having at least one of: a same start point and a same end point; a same direction and length; and a common potential error.

4. The method of claim 3, wherein error processes not common to similar lines forming a merged line are removed from association with said merged line.

5. The method of claim 1, wherein the array comprises a predetermined number N of line circuit layers and the detection events are cyclically written to the array such that a first line circuit layer of the array stores detection events associated with error detection rounds that correspond to 1 modulo N.

6. The method of claim 1, wherein the array comprises a plurality of line circuit layers, the number of line circuit layers in the plurality of line circuit layers being a power of two.

7. The method of claim 1, wherein the array is stored in a processor cache during execution of the quantum algorithm.

8. The method of claim 1, wherein the array comprises multiple line circuit layers that are representative of respective error detection rounds performed by quantum error correction circuits that are grouped together in the quantum computer.

9. The method of claim 1, wherein determining the one or more errors in the execution of the quantum computing algorithm comprises using a perfect matching process.

10. The method of claim 1, wherein determining the one or more errors in the execution of the quantum computing algorithm comprises using a minimum weight perfect matching process to pair the detection events in the array that are connected by one or more lines in one or more of the line circuit layers.

11. The method of claim 1, wherein determining the one or more errors in the execution of the quantum computing algorithm comprises using a minimum weight perfect matching process to match one or more of the detection events with a boundary of the array.

12. The method of claim 1, wherein determining the one or more errors in the execution of the quantum computing algorithm comprises at least one of:
   exploring the array around a selected detection event to find an untouched detection event and pairing the selected detection event with the untouched detection event; and
   exploring the array around a selected detection event to find a previously explored region associated with a different detection event and pairing the selected detection event with the different detection event.

13. The method of claim 12, wherein exploring the array around the selected detection event comprises using weights of lines included in the line circuit layers to determine an exploratory region of line circuit layers.

14. The method of claim 1, wherein the layered representation is constructed by a separate computer.

15. A system comprising one or more classical processing cores and one or more storage devices storing instructions that are operable, when executed by the one or more classical processing cores, to cause the one or more classical processing cores to perform operations comprising:
- receiving one or more syndrome measurements from a current round of error detection performed by quantum error detection circuits in a quantum computer that executes a quantum algorithm;
- converting the one or more syndrome measurements into detection events for the current round of error detection, wherein the detection events for the current round of error detection are written to a three dimensional data structure in the form of an array, the array comprising multiple line circuit layers representing previous rounds of error detection performed by the quantum error detection circuits at a sequence of steps in the quantum algorithm;
- determining one or more errors in the execution of the quantum algorithm from the detection events for the current round of error detection in dependence upon the multiple line circuit layers in the array, wherein
  - each line circuit layer of the multiple line circuit layers comprises a plurality of points, each point corresponding to an error detection event identified during a round of error detection represented by the line circuit layer,
  - the multiple line circuit layers comprise a plurality of unique lines, each unique line connecting pairs of points in the array, wherein a weight of each unique line represents a combined probability of detection events at each end of the line occurring together as a result of errors associated with one or more potential error processes in the execution of the quantum algorithm, and
  - determining one or more errors in the execution of the quantum algorithm from the detection events for the current round of error detection comprises matching the detection events for the current round of error detection to other detection events along paths of unique lines in the array; and
- causing correction of the one or more syndrome measurements based on the one or more errors.

16. The system of claim 15, wherein the plurality of unique lines in the multiple line circuit layers are constructed from a plurality of merged lines, wherein the merged lines comprise similar lines, the similar lines comprising lines associated with each potential error process having at least one of:
- a same start point and a same end point;
- a same direction and length; and
- a common potential error.

17. A computer program product comprising a non-transitory computer readable medium containing program instructions for causing a processing core to perform operations comprising:
- receiving one or more syndrome measurements from a current round of error detection performed by quantum error detection circuits in a quantum computer that executes a quantum algorithm;
- converting the one or more syndrome measurements into detection events for the current round of error detection, wherein the detection events for the current round of error detection are written to a three dimensional data structure in the form of an array, the array comprising multiple line circuit layers representing previous rounds of error detection performed by the quantum error detection circuits at a sequence of steps in the quantum algorithm;
- determining one or more errors in the execution of the quantum algorithm from the detection events for the current round of error detection in dependence upon the multiple line circuit layers in the array, wherein
  - each line circuit layer of the multiple line circuit layers comprises a plurality of points, each point corresponding to an error detection event identified during a round of error detection represented by the line circuit layer,
  - the multiple line circuit layers comprise a plurality of unique lines, each unique line connecting pairs of points in the array, wherein a weight of each unique line represents a combined probability of detection events at each end of the line occurring together as a result of errors associated with one or more potential error processes in the execution of the quantum algorithm, and
  - determining one or more errors in the execution of the quantum algorithm from the detection events for the current round of error detection comprises matching the detection events for the current round of error detection to other detection events along paths of unique lines in the array; and
- causing correction of the one or more syndrome measurements based on the one or more errors.

18. The computer program product of claim 17, wherein the plurality of unique lines in the multiple line circuit layers are constructed from a plurality of merged lines, wherein the merged lines comprise similar lines, the similar lines comprising lines associated with each potential error process having at least one of:
- a same start point and a same end point;
- a same direction and length; and
- a common potential error.

* * * * *